Jan. 30, 1962　　　H. W. LASTER　　　3,019,046
VEHICLE WITH ELEVATOR ROOF SECTION
Filed Feb. 24, 1960　　　　　　　　　　2 Sheets-Sheet 1
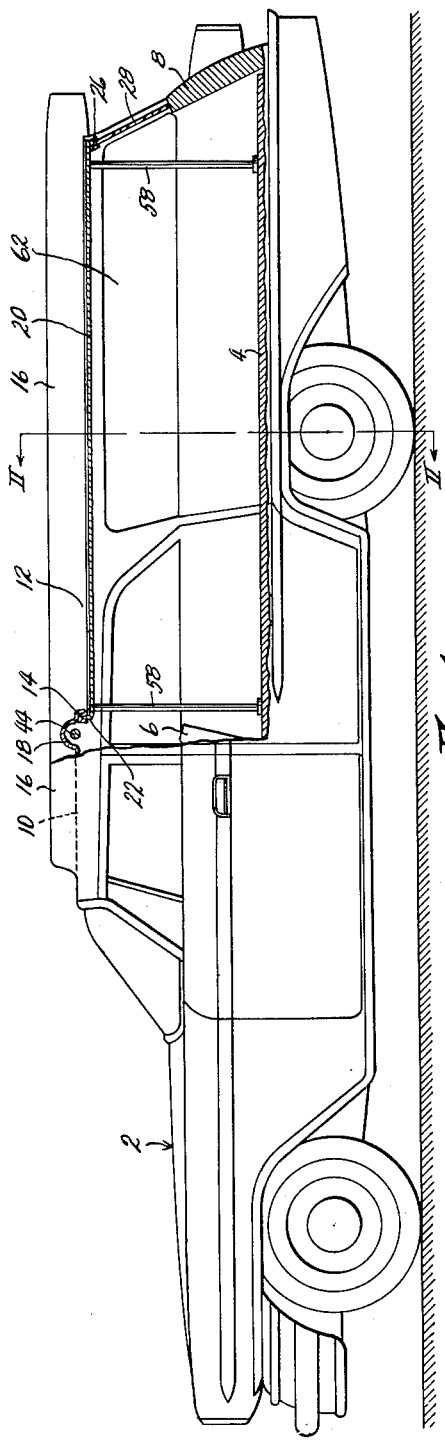
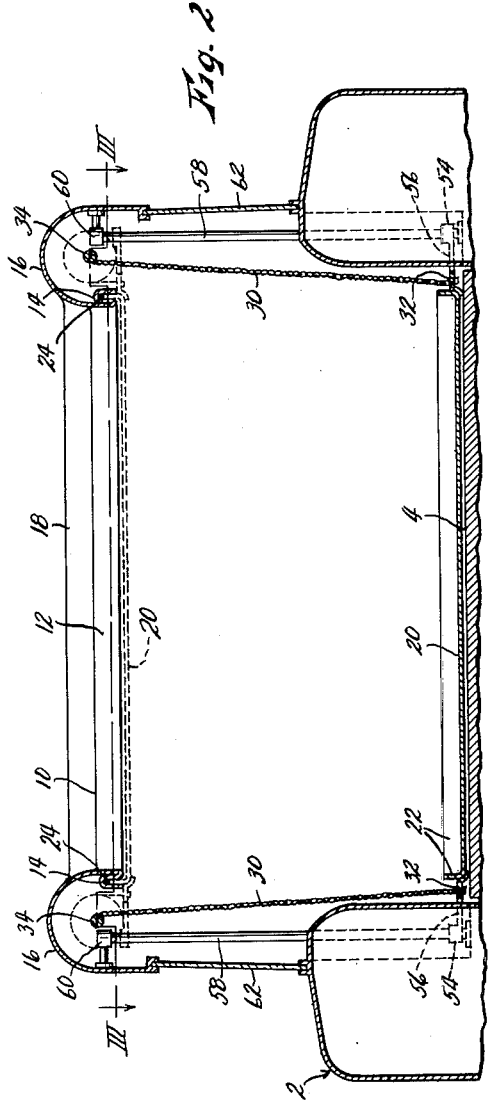
INVENTOR.
Harold W. Laster
BY John A. Hamilton
Attorney.

Jan. 30, 1962 H. W. LASTER 3,019,046
VEHICLE WITH ELEVATOR ROOF SECTION
Filed Feb. 24, 1960 2 Sheets-Sheet 2
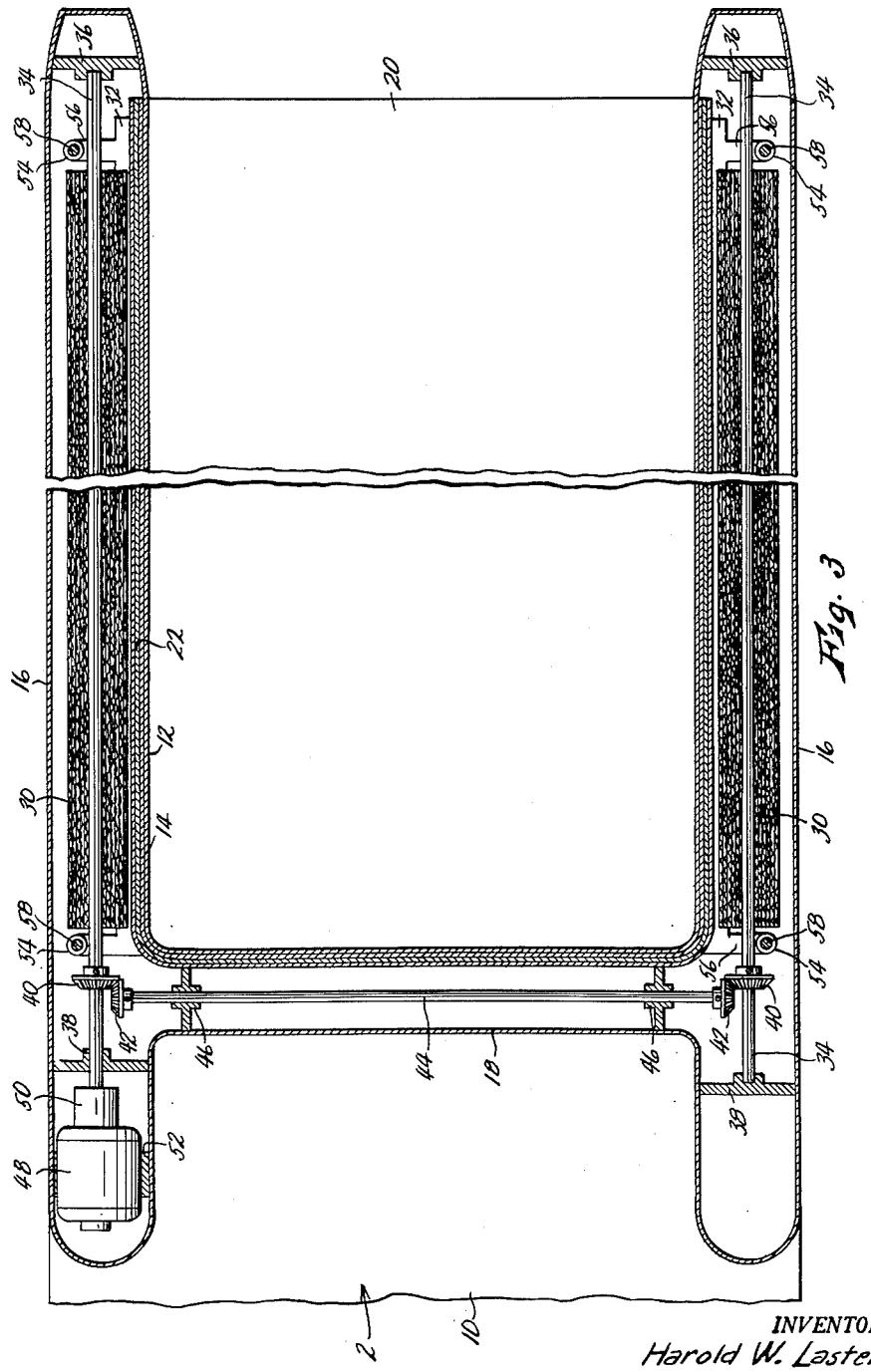
INVENTOR.
Harold W. Laster
BY John A. Hamilton
Attorney.

United States Patent Office
3,019,046
Patented Jan. 30, 1962

3,019,046
VEHICLE WITH ELEVATOR ROOF SECTION
Harold W. Laster, 54 S. 19th St., Kansas City, Kans.
Filed Feb. 24, 1960, Ser. No. 10,629
2 Claims. (Cl. 296—10)

This invention relates to new and useful improvements in cargo or cargo-passenger vehicles, and relates particularly to a means for increasing the cargo-carrying efficiency of such vehicles. While my invention is illustrated as applied to a station wagon, it will be readily apparent that it could be applied also to panel trucks and other vehicles.

The principal object of the present invention is the provision of a normally closed vehicle such as a station wagon or panel truck with a movable roof section which may when desired be lowered vertically substantially to the normal floor line of the vehicle, or to any intermediate point. When lowered, it serves as a cargo-carrying deck which, since the top of the vehicle is then open, may be utilized to carry loads of any reasonable height, even though said load projects above the top of the vehicle. In these days of lower and lower automobiles, the lack of vertical height has become a serious detriment to the cargo-carrying capacity of station wagons in particular. When the movable roof is in an intermediate position, it provides a deck that can be used simultaneously with the normal floor, thereby providing a double deck cargo space, both decks having side walls for preventing cargo from slipping off, and thereby increasing the utility of the vehicle for carrying certain types of loads. When the movable roof is fully raised, it seals the cargo space for loads which require protection against the weather.

Another object is the provision of a vehicle having a movable roof section of the character described wherein said roof section is supported, and raised and lowered, by stout pliable curtains arranged along the opposite longitudinal edges thereof. Said curtains provide side walls rising from the edges of the roof when said roof is in a lowered position, whereby to retain cargo on said roof and to protect the side windows of the station wagon against damage by the cargo.

A further object is the provision of means for preventing horizontal movement of the movable roof section when in a lowered position.

A still further object is the provision of means for providing a weather-tight seal around the movable roof section when it is raised, whereby to prevent the passage of water therearound and to provide a tightly sealed cargo compartment when desired.

Other objects are simplicity and economy of construction, efficiency and dependability of operation, and applicability to various types of vehicles.

With these objects in view, as well as other objects which will appear in the course of the specification, reference will be had to the drawing, wherein:

FIG. 1 is a side elevational view of a station wagon, partially broken away, fitted with an elevator roof section according to the present invention, FIG. 2 is an enlarged, fragmentary sectional view taken on line II—II of FIG. 1, showing the elevator roof section lowered in solid lines and raised in dotted lines, and FIG. 3 is a fragmentary, foreshortened sectional view taken on line III—III of FIG. 2.

Like reference numerals apply to similar parts throughout the several views, and the numeral 2 indicates generally a station wagon which is of ordinary design except for specific details to be described. The numeral 4 indicates the normal cargo-carrying deck of the wagon, said deck extending from the back 6 of the front seat to the tail gate 8, and is substantially horizontal. It will be understood that while said deck has permanent and immovable portions, the major area thereof is formed by folding down and inverting the back and seat cushions of intermediate and rear seat structures. However, the structure and mechanism for providing the movability of said seats forms no part of the present invention, and is not here shown. So far as the present invention is concerned, the deck 4 may be considered as rigid and fixed.

The roof 10 of the wagon is provided with a rectangular opening 12 extending the major portion of the width of the vehicle. The forward edge of the opening is disposed just to the rear of the back 6 of the front seat, and the opening extends to the rearward edges of the roof. Its lateral edges are parallel to the longitudinal midline of the vehicle. Bounding the front and side edges of the opening, the sheet metal forming the vehicle body is formed to present a downwardly opening channel 14. Adjacent each of the side edges of the opening, the body is formed to present a substantially semi-cylindrical tunnel 16. Said tunnels open downwardly into the vehicle, and extend the full length of opening 12, and forwardly therefrom. Similarly, the roof is formed to present a raised transverse tunnel 18 extending between and connecting tunnels 16 just forwardly of opening 12.

Opening 12 is normally closed by a substantially horizontal roof section 20 which may be raised or lowered as will be described. Since it also serves as a cargo deck, it may be reinforced by any suitable ribbing or the like, not shown. It is provided along its side and forward edges with an upturned lip 22 which, when the roof section is elevated, extends snugly into channel 14, bounding the opening 12. Channel 14 also has a rubber or other gasket 24 therein (see FIG. 2), which further assists in providing a water and weatherproof seal around roof section 20. Along the rearward edge of roof section 20, a window guide channel 26 is affixed to the lower surface thereof to receive the upper edge of a window 28 which usually forms the upper portion of the tail gate 8. Also, said window is usually downwardly retractable into the lower portion of the tail gate, and the tail gate pivots outwardly to form a rearward extension of deck 4. When window 28 is retracted, it permits movable roof section 20 to be lowered without interference from the tail gate.

Roof section 20 is supported, and raised or lowered, by a pair of curtains 30 extending respectively along the side edges thereof, and extending nearly the full length of said side edges. Each of said curtains is secured along its lower edge to a flange 32 welded or otherwise secured to an edge of roof section 20, and is secured along its upper edge to a shaft 34 extending longitudinally in the tunnel 16 at the corresponding side of the vehicle. The curtains are of a stout but pliable material. A chain-link wire mesh is quite satisfactory, although other materials could be utilized. Each of shafts 34 is supported rotatably in a bearing 36 at the rearward end of its tunnel 16, and a bearing 38 mounted in said tunnel just forwardly of transverse tunnel 18. A bevel gear 40 is fixed on each of shafts 34 in alignment with tunnel 18, and are meshed respectively with a pair of bevel gears 42 fixed on the opposite ends of a shaft 44 extending longitudinally through tunnel 18, said shaft being journalled in bearings 46 affixed in said tunnel. Thus whenever either of shafts 34 is turned, gears 40 and 42 and shaft 44 will function to produce an equal and opposite rotation of the other shaft 34. One of shafts 34 is extended forwardly, and is operably connected to an electric motor 48 through a suitable geared speed reduction unit 50. Said motor is mounted in the extreme forward end portion of one of tunnels 16, as by a suitable bracket 52. Movable roof section 20 is guided adjacent each of its four corners by a tubular sleeve 54 affixed to the outer end of an arm 56 extending outwardly from flange 32 of said roof section. Each of said sleeves is disposed for vertical sliding movement on a vertical rod 38. At its lower end, each rod 58 is secured to a fixed and immovable portion of deck 4, and at its upper end to a bracket 60 (see FIG. 2) fixed to the vehicle body approximately at the level of shafts 34.

The operation of the device is believed to be reasonably self-evident. When roof 20 is raised, as shown in FIG. 1 and in dotted lines in FIG. 2, curtains 30 are reeled up on shafts 34, urging lip 22 of roof 20 into channel 14, and against the gasket 24 therein, whereby to seal the edges of roof section 20 tightly against the entry of water or wind, and to render the interior of the vehicle weatherproof. It will be noted that in said raised position roof section 20 may serve as a luggage rack, and that tunnels 16 and 18 form low raised walls along three sides thereof to retain luggage or other objects thereon. Motor 48 is reversible, and is controlled by suitable switches, not shown, located preferably in a position convenient to the driver. When the motor is operated in one direction, it turns shafts 34, which serve as drums or reels for curtains 30, to unreel said curtains therefrom, whereby movable roof section 20 is lowered, either to rest substantially on deck 4 as shown in solid lines in FIG. 2, or to any intermediate position. When the motor is operated in a reverse direction, it turns shafts 34 to reel curtains 30 thereon, whereby the movable roof section is raised. Speed reduction unit 50 is of a type, usually incorporating a worm gear drive, such that no amount of weight imposed on roof section 20 can cause rotation of motor 48.

When roof section 20 is lowered, the roof opening 12 is of course unobstructed, and loads may be carried on roof section 20 which are of such height that they extend upwardly through opening 12 and well above the vehicle. This of course greatly increases the load-carry capacity and convenience of the vehicle, since the vertical height of the cargo space in most station wagons is inconveniently and objectionably small. When roof section 20 is lowered, curtains 30 form protective slide walls rising from its edges, whereby both to retain loads on the roof section, and to protect the side windows 62 of the station wagon from breakage or damage by such loads. Guide rods 58 prevent roof section 20 from moving horizontally in any direction when in a lowered position, and also serve to insure accurate engagement of lip 22 in channel 14 when the roof section is raised. When roof section 20 is lowered to an intermediate position, say to the lower edges of side windows 62, both it and the normal cargo deck 4 may be used as load-carrying surfaces, both having protective side walls.

While I have shown and described a specific embodiment of my invention, it will be readily apparent that many minor changes of structure and operation could be made without departing from the spirit of the invention as defined by the scope of the appended claims.

What I claim as new and desire to protect by Letters Patent is:

1. A vehicle body defining a cargo-carrying space having a deck and a fixed roof spaced above said deck, said roof having an opening formed therein, a substantially horizontal movable roof section normally sealing said opening, and operating means for lowering said movable roof section vertically from said opening, whereby said opening is uncovered and a load supported on said movable roof section may extend upwardly through said opening, said operating means comprising a pair of drums carried rotatably by said body respectively adjacent opposite sides of said opening, a pliable curtain wound on each of said drums and having its free edge secured to the corresponding edge of said movable roof section, said curtain having a horizontal width approximately equal to the length of the edge of said movable roof section to which it is attached, and means for rotating said drums, said curtains constituting protective walls rising from opposite edges of said movable roof section when said roof section is lowered.

2. The structure as defined in claim 1 wherein each of said curtains comprises a chain-link wire mesh.

References Cited in the file of this patent

UNITED STATES PATENTS

| | | |
|---|---|---|
| 2,520,698 | Sniezyk | Aug. 29, 1950 |
| 2,601,684 | Martin | July 1, 1952 |
| 2,772,917 | Goldman | Dec. 4, 1956 |
| 2,793,907 | Hess | May 28, 1957 |